(12) United States Patent
Kim et al.

(10) Patent No.: US 8,958,152 B2
(45) Date of Patent: Feb. 17, 2015

(54) OPTICAL PLATE AND TILED DISPLAY APPARATUS HAVING THE SAME

(75) Inventors: Joong-Hyun Kim, Asan-si (KR); Sang-Hoon Lee, Daejeon (KR); Min-Young Song, Asan-si (KR); Seung-Mo Kim, Yongin-si (KR)

(73) Assignee: Samsung Display Co., Ltd. (KR)

( * ) Notice: Subject to any disclaimer, the term of this patent is extended or adjusted under 35 U.S.C. 154(b) by 174 days.

(21) Appl. No.: 13/219,338

(22) Filed: Aug. 26, 2011

(65) Prior Publication Data
US 2012/0062996 A1  Mar. 15, 2012

(30) Foreign Application Priority Data
Sep. 9, 2010 (KR) .................... 10-2010-0088333

(51) Int. Cl.
G03B 21/56 (2006.01)
G02B 3/08 (2006.01)

(52) U.S. Cl.
CPC . *G02B 3/08* (2013.01); *G02B 1/111* (2013.01)
USPC ....................................... 359/443

(58) Field of Classification Search
USPC ......... 359/601, 614, 443, 450, 454–457, 577, 359/580–590
See application file for complete search history.

(56) References Cited

U.S. PATENT DOCUMENTS

| | | | | |
|---|---|---|---|---|
| 6,947,212 B2 * | 9/2005 | Karasawa et al. | ............. | 359/457 |
| 7,453,636 B2 * | 11/2008 | Yeo et al. | ....................... | 359/453 |
| 2005/0233123 A1 * | 10/2005 | Weber et al. | .................. | 428/215 |
| 2007/0286994 A1 * | 12/2007 | Walker et al. | ................. | 428/212 |

FOREIGN PATENT DOCUMENTS

| | | |
|---|---|---|
| JP | 2005-107044 A | 4/2005 |
| JP | 2009-162999 A | 7/2009 |
| KR | 1020010079154 A | 8/2001 |

* cited by examiner

*Primary Examiner* — Stephone B Allen
*Assistant Examiner* — James McGee
(74) *Attorney, Agent, or Firm* — Innovation Counsel LLP

(57) ABSTRACT

An optical plate and a tiled display apparatus having the optical plate of the present invention include a base substrate and a Fresnel lens having a plurality of Fresnel patterns protruding toward the base substrate from a flat upper surface. The optical plate further comprises an anti-reflection layer, and a high-refraction layer having a refractive index higher than that of the anti-reflection layer. The optical plate comprises an adhesive layer disposed between the Fresnel lens and the base substrate to affix the Fresnel lens to the base substrate, and a spacer disposed between the Fresnel lens and the adhesive layer to maintain a distance between the Fresnel lens and the adhesive layer. The base substrate includes a first portion having a first thickness, a second portion having a second thickness thinner than the first thickness and a connecting portion disposed between the first and second portions.

4 Claims, 4 Drawing Sheets

OPTICAL PLATE AND TILED DISPLAY APPARATUS HAVING THE SAME

PRIORITY STATEMENT

This application claims priority under 35 U.S.C. §119 to Korean Patent Application No. 10-2010-88333, filed on Sep. 9, 2010, in the Korean Intellectual Property Office (KIPO), the contents of which are herein incorporated by reference in their entireties.

BACKGROUND OF THE INVENTION

1. Field of the Invention

Embodiments of the present invention relate generally to flat panel displays. More specifically, embodiments of the invention relate to an optical plate and a tiled display apparatus having the same.

2. Description of the Related Art

A tiled display apparatus is a display apparatus having a relatively large-sized screen made up of a plurality of smaller display modules that are connected with each other, so as to increase the display area. For example, four 40-inch display modules can be arranged in 2×2 matrix fashion, thus generating a display area 80 inches across. Thus, larger-sized screens such as 160-inch or 320-inch screens may be made simply by increasing the number of the display modules.

However, typically, each of the display modules included in the tiled display apparatus has a non-display area surrounding a peripheral portion of the display area. The overall image of the tiled display apparatus thus appears broken up by a matrix of non-display areas, which is not desirable.

To solve the above problem, each of the images provided from each of the display modules is enlarged, allowing adjacent images to be connected to each other. A convex lens or a Fresnel lens may be disposed on an upper surface over the display modules, and used to enlarge the images.

However, when such lenses are disposed over the display module, ambient light (light incident from outside sources) typically reflects off of the lens in an irregular manner, reducing the quality of the resulting image. In addition, these lenses add undesired weight to the display apparatus.

SUMMARY OF THE INVENTION

Example embodiments of the present invention provide an optical plate capable of preventing external light from being reflected, and decreasing thickness and weight of a display apparatus, and a tiled display apparatus having the optical plate.

According to one aspect of the present invention, an optical plate includes a base substrate, a Fresnel lens and an anti-reflection layer. An image is incident into the base substrate. The Fresnel lens is affixed to the base substrate. The Fresnel lens includes a plurality of Fresnel patterns extending toward the base substrate, and includes a substantially flat upper surface. The anti-reflection layer is formed on the upper surface of the Fresnel lens, and can reduce a reflection of ambient light.

In an example embodiment of the present invention, the optical plate may further include a high-refraction layer that is disposed between the Fresnel lens and the anti-reflection layer and has a refractive index higher than that of the anti-reflection layer. The high-refraction layer may include polyethylene terephthalate (PET), and the anti-reflection layer may include polytetrafluoroethylene (PTFE).

In an example embodiment of the present invention, the optical plate may further include an adhesive layer disposed between the Fresnel lens and the base substrate to affix the Fresnel lens to the base substrate. The optical plate may further include a spacer disposed between the Fresnel lens and the adhesive layer to maintain a distance between the Fresnel lens and the adhesive layer.

In an example embodiment of the present invention, the base substrate may include a first portion having a first thickness, a second portion having a second thickness thinner than the first thickness and a connecting portion disposed between the first and second portions. Lower surfaces of the first, second and connecting portions may be substantially coplanar, and the connecting portion may have a generally inclined surface connecting an upper surface of the first portion with an upper surface of the second portion. An inclination angle of the inclined surface with respect to the upper surface of the second portion may be more than about 0 degrees and not more than about 20 degrees. In other example, the upper surfaces of the first and second portions and the connecting portion may be substantially coplanar.

According to another aspect of the present invention, an optical plate includes a base substrate and a Fresnel lens. The base substrate includes a first portion having a first thickness, a second portion having a second thickness thinner than the first thickness and a connecting portion disposed between the first and second portions. The Fresnel lens is affixed to the base substrate, includes a substantially flat upper surface, and has a plurality of Fresnel patterns extending from the upper surface toward the base substrate.

The optical plate may further include an anti-reflection layer disposed on the upper surface of the Fresnel lens and configured to reduce a reflection of ambient light. The optical plate may further include a high-refraction layer that is disposed between the Fresnel lens and the anti-reflection layer and has a refractive index higher than that of the anti-reflection layer.

In an example embodiment of the present invention, the lower surfaces of the first, second portions and the connecting portion may be substantially coplanar, and the connecting portion may have a generally inclined surface connecting an upper surface of the first portion with an upper surface of the second portion. An inclination angle of the inclined surface with respect to the upper surface of the second portion may be more than about 0 degrees and not more than about 20 degrees.

In an example embodiment of the present invention, the upper surfaces of the first and second portions and the connecting portion may be substantially coplanar.

According to another aspect of the present invention to the present invention, a tiled display apparatus includes a display unit having a plurality of display modules adjacent to each other, each of the display modules having a display area and a non-display area, and a plurality of optical plates each disposed over one of the display modules. Each optical plate includes a base substrate, a Fresnel lens, an anti-reflection layer and a high-refraction layer. Each optical plate is positioned so that an image output from the corresponding display modules is incident to its base substrate, the Fresnel lens is affixed to the base substrate, and has a substantially flat upper surface with a plurality of Fresnel patterns extending from the upper surface toward the base substrate. For each optical plate, the anti-reflection layer is formed on the upper surface of the Fresnel lens and is configured to reduce a reflection of ambient light. The high-reflection layer is disposed between the Fresnel lens and the anti-reflection layer and has a refractive index higher than that of the anti-reflection layer.

In an example embodiment of the present invention, the base substrate may include a first portion having a first thickness and a width, the first portion positioned to correspond to the associated non-display area, a second portion having a second thickness thinner than the first thickness, and a connecting portion disposed between the first and second portions.

According to another aspect of the present invention, a tiled display apparatus includes a display unit having a plurality display modules disposed adjacent to each other, each of the display modules having a display area and a non-display area, and the optical plates each disposed over one of the display modules. The optical plate includes a base substrate and a Fresnel lens. The base substrate includes a first portion having a first thickness and a width, and positioned to correspond to the associated non-display area, a second portion having a second thickness thinner than the first thickness, and a connecting portion disposed between the first and second portions. The Fresnel lens is affixed to the base substrate, and has a substantially flat upper surface, with a plurality of Fresnel patterns extending from the upper surface toward the base substrate.

In an example embodiment of the present invention, lower surfaces of the first, second and connecting portions may be substantially coplanar, and the connecting portion may have an inclined surface connecting an upper surface of the first portion with an upper surface of the second portion. An inclination angle of the inclined surface with respect to the upper surface of the second portion may be more than about 0 degrees and not more than about 20 degrees.

In an example embodiment of the present invention, the upper surfaces of the first, second and connecting portions may be substantially coplanar.

According to the optical plate and the tiled display apparatus having the optical plate, the anti-reflection layer is formed on the flat upper surface of the Fresnel lens having a reversed Fresnel pattern, so that the anti-reflection layer has a more uniform thickness. In addition, the high-refraction layer having the refractive index higher than that of the anti-reflection layer is disposed between the Fresnel lens and the anti-reflection layer, so that reflection of ambient light is reduced.

Further, the thickness of the base substrate of the optical plate at the display area is different from that at the non-display area, so that the weight of the optical plate and the tiled display apparatus may be decreased and the image may be prevented from being excessively enlarged in the display area. Thus, the total image may be prevented from being distorted.

BRIEF DESCRIPTION OF THE DRAWINGS

The above and other features and advantages of the present invention will become more apparent by describing in detail the preferred embodiments thereof with reference to the accompanying drawings, in which.

DETAILED DESCRIPTION OF THE INVENTION

Hereinafter, the present invention will be explained in detail with reference to the accompanying drawings.

Figure 1:
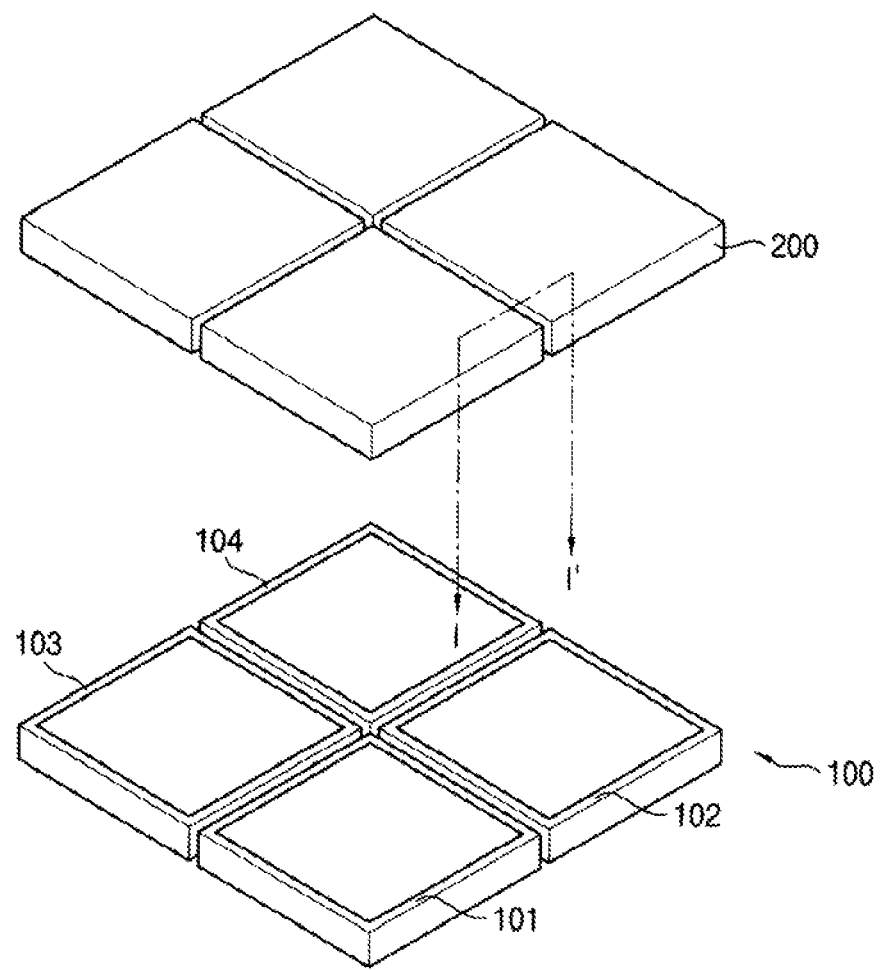
FIG. 1 is an exploded perspective view illustrating a tiled display apparatus according to an example embodiment of the present invention.
Figure 2:
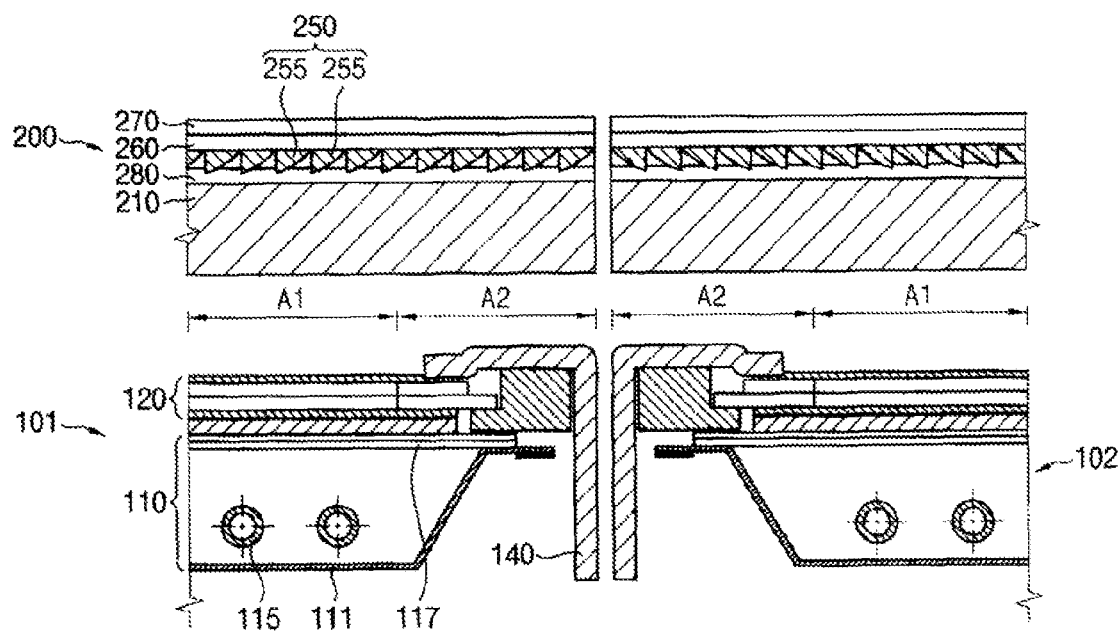
FIG. 2 is a cross-sectional view taken along a line I-I' in FIG. 1.
Figure 3:
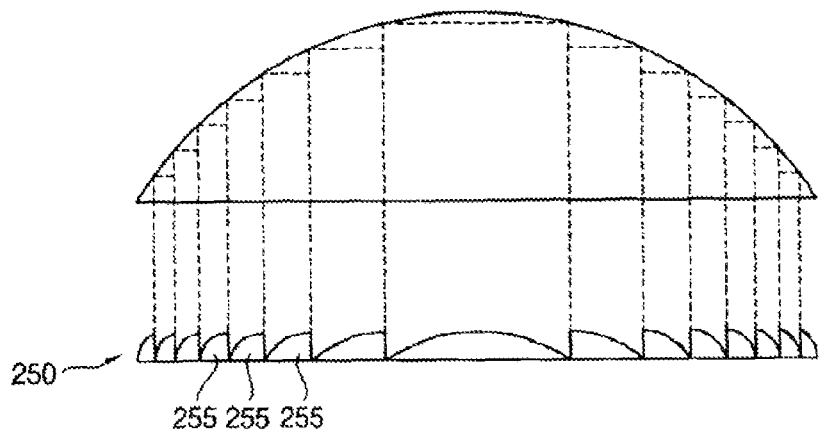
FIG. 3 is a plan view explaining the Fresnel Lens Principle.

FIG. 1 is an exploded perspective view illustrating a tiled display apparatus according to an example embodiment of the present invention. FIG. 2 is a cross-sectional view taken along line I-I' in FIG. 1. FIG. 3 is a plan view explaining the Fresnel Lens Principle.

Referring to FIGS. 1, 2 and 3, the tiled display apparatus according to the present example embodiment includes a display unit 100 having a plurality of display modules 101, 102, 103 and 104, and a plurality of optical plates 200 disposed over the display modules 101, 102, 103 and 104, respectively. Although FIG. 1 shows four display modules such as the first to fourth display modules 101 to 104 are disposed in a 2×2 matrix configuration, the number of the display modules is not limited thereto. For example, the tiled display apparatus according to the present example embodiment may include nine display modules disposed in a 3×3 matrix, or sixteen display modules disposed in a 4×4 matrix.

The display modules 101, 102, 103 and 104 used in the present example embodiment in FIGS. 1 and 2 are liquid crystal display (LCD) modules including a backlight assembly 110 providing light, and an LCD panel assembly 120 displaying an image using the light provided from the backlight assembly 110. However, the display modules 101 to 104 used in the tiled display apparatus of the present example embodiment are not limited to LCD modules. For example, the display modules 101-104 may employ plasma display modules including plasma display panels (PDPs), organic light emitting diode (OLED) display modules including OLEDs, etc.

The backlight assembly 110 may include a lower receiving container 111, a light source 115 and various optical members 117. According to the present example embodiment, the tiled display apparatus in FIG. 2 includes a lamp as the light source 115, but the light source 115 is not limited to lamps. For example, the light source 115 may include a light emitting diode (LED) instead.

The LCD panel assembly 120 controls a light transmittance of the light provided from the backlight assembly 110 through a liquid crystal, so as to display an image.

Each of display modules 101 to 104 includes a display area A1 and a non-display area A2. The image is displayed in the display area A1 but is not in the non-display area A2. For example, the non-display area A2 may include a peripheral area where driving circuits are disposed, or an edge portion of an upper receiving container 140.

Due to the non-display areas A2, the image is not displayed at the boundaries between the display modules 101 to 104, such as a boundary between the first and second display modules 101 and 102. This boundary can be visible to observers, which is undesirable.

The optical plate 200 is disposed over each of the display modules 101 to 104 to prevent the boundary of the display modules 101 to 104 from being visible to observers. The optical plate 200 enlarges the image outputted from the display area A1 by an enlargement rate. For example, the optical plate 200 enlarges the image outputted from the display area A1 to cover the non-display area A2. The enlargement rate is adjusted so that the boundaries of neighboring images lie substantially adjacent to each other, and so that the boundaries between display modules are not seen by observers.

The optical plate includes a base substrate 210, a Fresnel lens 250 fixed to the base substrate 210, a high-refraction layer 260 disposed over the Fresnel lens 250, and an anti-reflection layer 270 disposed over the high-refraction layer 260.

In operation, the image output by the display modules 101 to 104 is incident to the base substrate 210. In addition, the base substrate 210 is fixed to the Fresnel lens 250. The enlargement rate of the image enlarged by the optical plate 200 is dependent on a length of the non-display area A2, a focal distance of the Fresnel lens 250, and a refractivity and a thickness of the various materials included in the optical plate 200. Accordingly, the enlargement rate may be controlled by adjusting the thickness and the refractivity of the base substrate 210. For example, the base substrate 210 may include various amounts of differing polymers that have differing refractivities, such as polycarbonate (PC) or polymethyl methacrylate (PMMA).

The Fresnel lens 250 is a condensing lens enlarging the image. the Fresnel lens 250 has substantially uniform thickness, so the Fresnel lens 250 is different from a convex lens having a convex central portion. The Fresnel lens 250 includes a plurality of Fresnel patterns 255. Referring to FIG. 3, an upper surface of the Fresnel patterns 255 is substantially the same as that of the corresponding area of the condensing, and the thicknesses (or heights) of the Fresnel patterns 255 are substantially uniform. That is, the condensing lens is divided into a plurality of areas whose curved upper surfaces each have a substantially uniform thickness as shown. In each area, the Fresnel pattern 255 has the same curved profile as the corresponding curved upper surface of the condensing lens, but has a thickness the same as the curved upper surface, rather than that of the entire condensing lens. The Fresnel patterns 255 can be made of any suitable material. For example, the Fresnel lens 250 may include an acrylic resin such as polymethly methacrylate (PMMA).

The optical plate 200 according to the present example embodiment includes the Fresnel lens 250, and the Fresnel patterns 255 of the Fresnel lens 250 protrude toward the display modules 101 to 104. For example, the Fresnel lens 250 has a flat upper surface, and has a reverse Fresnel structure protruding toward the base substrate 210.

The anti-reflection layer 270 reduces reflection of ambient light, and is disposed on the flat upper surface of the Fresnel lens 250. When the upper surface is formed with Fresnel patterns 255 of the Fresnel lens 250 rather than a flat surface, it is difficult to form the anti-reflection layer 270 with a uniform thickness. When the thickness of the anti-reflection layer 270 is not uniform, it may not prevent ambient light from being reflected, and thus the light transmittance may be decreased.

According to the present example embodiment, the Fresnel lens 250 has a reverse Fresnel structure, and the anti-reflection layer 270 is formed on the flat upper surface of the Fresnel lens 250. For reducing albedo, the anti-reflection layer 270 can include a material having a low refractive index. For example, the anti-reflection layer 270 may include polymethly methacrylate (PMMA) having a refractive index of about 1.49, or include polytetrafluoroethylene (PTFE) having a refractive index of about 1.36.

For preventing reflection of ambient light, a high-refraction layer 260 is disposed between the Fresnel lens 250 and the anti-reflection layer 270. The refractive index of the high-refraction layer 260 is higher than that of the anti-reflection layer 270.

The high-refraction layer 260 includes a material having a high refractive index (i.e., any suitable refractive index greater than that of anti-reflection layer 270). For example, the high-refraction layer 260 may include polyethylene terephthalate (PET) having a refractive index of about 1.58. The albedo is proportional to the difference between the squares of the refractive index of the anti-reflection layer 270 and the refractive index of the high-refraction layer 260. As the high-refraction layer 260 has the refractive index greater than that of the anti-reflection layer 270, the resulting albedo is lower. When the high-refraction layer 260 includes polyethylene terephthalate (PET) having a refractive index of about 1.58, the anti-reflection layer 270 may include polytetrafluoroethylene (PTFE) having a relatively low refractive index of about 1.36. In this case, the albedo calculated theoretically may be decreased to be less than 1% when the optical plate includes the anti-reflection layer 270 and the high-refraction layer 260.

According to the present example embodiment, when the anti-reflection layer 270 is disposed on the flat upper surface of the Fresnel lens 250, the anti-reflection layer 270 may be disposed with a substantially uniform thickness. In addition, when the high-refraction layer 260 having the refractive index higher than that of the anti-reflection layer 270 is disposed between the Fresnel lens 250 and the anti-reflection layer 270, reflection of ambient light is reduced.

An adhesive layer 280 may be further disposed between the Fresnel lens 250 and the base substrate 210, to fix the Fresnel lens 250 to the base substrate 210. For example, an adhesive resin can be coated on the base substrate 210 for adhesion, and then the Fresnel lens (having the anti-reflection layer 270 and the high-refraction layer 260 formed on the Fresnel lens, and having the reverse Fresnel structure) is attached on the adhesive resin and cured. Thus, the optical plate 200 may be constructed as a unitary product.

Figure 4:
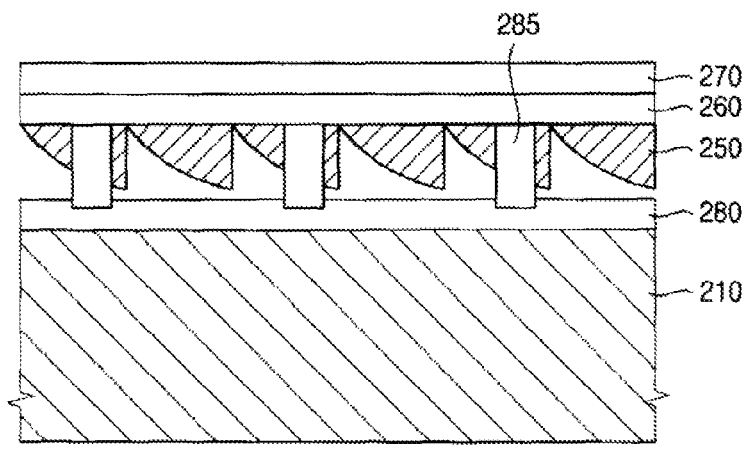
FIG. 4 is a cross-sectional view illustrating an optical plate according to another example embodiment of the present invention.

FIG. 4 is a cross-sectional view illustrating an optical plate according to another example embodiment of the present invention.

Referring to FIG. 4, an optical plate 204 according to the present example embodiment is substantially the same as or similar to the optical plate 200 according to the previous example embodiment in FIG. 2, except that the optical plate 204 further includes a spacer 285 maintaining a distance between the Fresnel lens 250 and the adhesive layer 280. Thus, the same reference numerals will be used to refer to the same or like parts as those described in precious embodiment, and any further explanation will be omitted.

Referring to FIG. 4, the optical plate 204 includes the base substrate 210, the Fresnel lens 250, the high-refraction layer 260, the anti-reflection layer 270, the adhesive layer 280 and the spacer 285. The Fresnel lens 250 is fixed to the base substrate 210. The high-refraction layer 260 is disposed on the Fresnel lens 250. The anti-reflection layer 270 is disposed on the high-refraction layer 260. The adhesive layer 280 is disposed between the Fresnel lens 250 and the base substrate 210 to fix the Fresnel lens 250 to the base substrate 210. The spacer 285 maintains the distance between the Fresnel lens 250 and the adhesive layer 280.

The base substrate 210, the Fresnel lens 250, the high-refraction layer 260 and the anti-reflection layer 270 are explained in detail in FIGS. 1 to 3, and thus any repetitive explanation will be omitted.

The spacer 285 is disposed between the Fresnel lens 250 and the adhesive layer 280 to maintain the distance between the Fresnel lens 250 and the adhesive layer 280, and is attached to each of the Fresnel lens 250 and the adhesive layer 280 (although this need not necessarily be the case, and the spacer 285 may be attached to only one of the lens 250 and layer 280).

Like the optical plate 200 in FIG. 2, when the spacer 285 is not present and Fresnel patterns 255 directly contact the adhesive layer 280, the Fresnel pattern 255 pushes partially into the adhesive layer 280, which tends to squash and/or distort the Fresnel pattern 255. When the shape of the Fresnel pattern 255 is distorted, it is less able to guide light as intended, and thus the function of the Fresnel lens 250 becomes less capable of enlarging the displayed image.

Accordingly, the spacer 285 maintains the distance between the Fresnel lens 250 and the adhesive layer 280 to prevent the Fresnel patterns 255 of the Fresnel lens 250 from being pushed into, or crushed against, the adhesive layer 280. Thus, the Fresnel patterns 255 of the Fresnel lens 250 are better maintained in their original shapes, and the function of the Fresnel lens 250 (i.e., enlarging the displayed image) is maintained.

For manufacturing an optical plate 204 that includes spacer 285, for example, the Fresnel lens 250 is first fabricated with the high-refraction layer 260 and the anti-reflection layer 270, and then the spacers 285 may be formed on an arbitrary portion of the Fresnel patterns 255 of the Fresnel lens 250 using a soft molding method. In the soft molding method, patterns having a few to tens of micrometers are carved and transcribed at room temperature. Use of the soft molding method helps to reduce expenses, and increase yield. The adhesive resin is coated on the base substrate 210, and the spacer 285 is attached to the adhesive resin and cured. Then, the optical plate 204 is completed as a unitary product.

Figure 5:
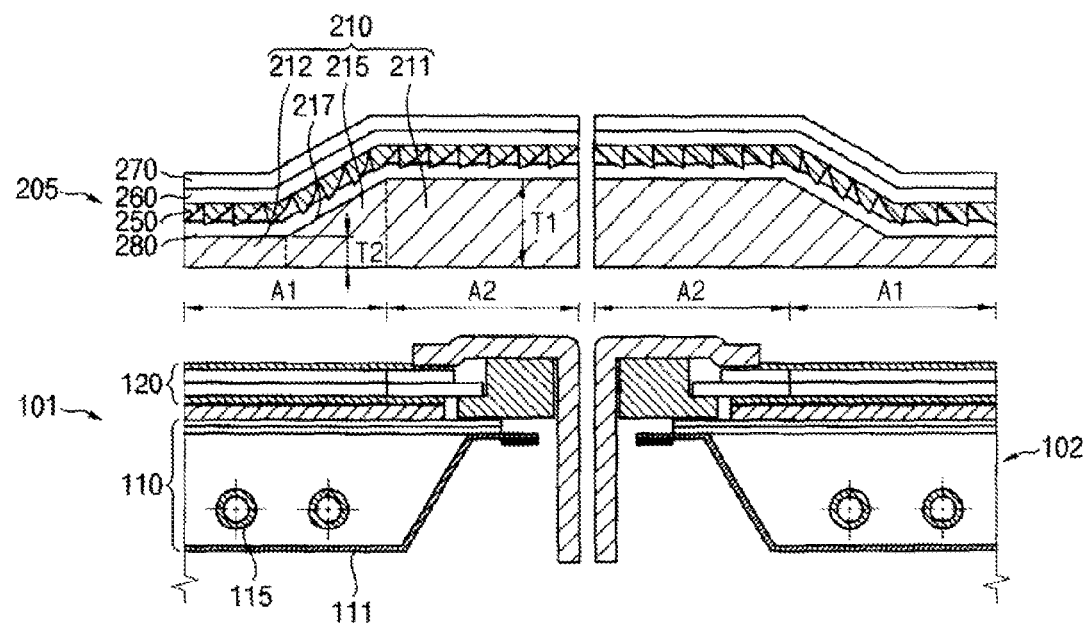
FIG. 5 is a cross-sectional view illustrating a tiled display apparatus according to still another example embodiment of the present invention.
Figure 6:
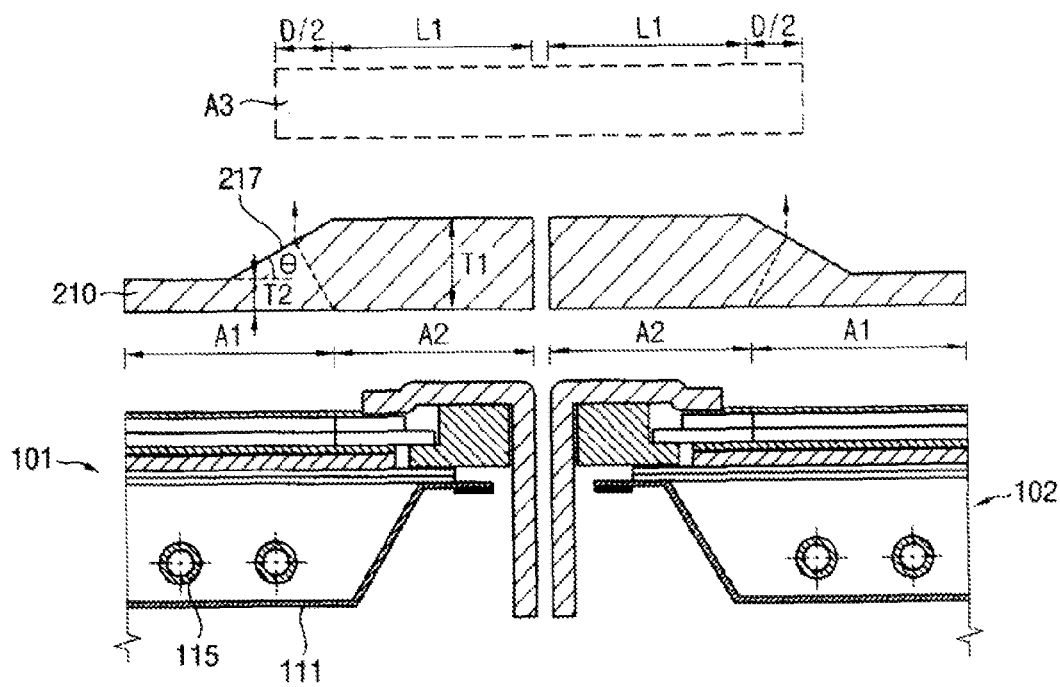
FIG. 6 is a cross-sectional view explaining a reason for adjusting an inclined angle of a connecting portion of a base substrate in FIG. 5.

FIG. 5 is a cross-sectional view illustrating a tiled display apparatus according to still another example embodiment of the present invention. FIG. 6 is a cross-sectional view explaining a reason for adjusting an inclined angle of a connecting portion of a base substrate in FIG. 5.

An optical plate 205 of the tiled display apparatus according to the present example embodiment is substantially the same as or similar to the optical plate 200 of the tiled display apparatus according to the previous example embodiment in FIGS. 1 and 2, except that a thickness of the optical plate 205 varies. Thus, the same reference numerals will be used to refer to the same or like parts of the optical plate 200 of the tiled display apparatus as those described in previous embodiment, and any further explanation will be omitted.

Similar to the tiled display apparatus according to the previous example embodiment in FIGS. 1 and 2, the tiled display apparatus in FIG. 5 includes display unit 100 having a plurality of display modules 101 and 102, and a plurality of optical plates 205 disposed over the display modules 101 and 102, respectively. For example, the tiled display apparatus according to the present example embodiment may include four display modules disposed in a 2×2 matrix shape, nine display modules disposed in a 3×3 matrix shape, or sixteen display modules disposed in a 4×4 matrix shape. However, any number of display modules is contemplated.

The display modules 101 and 102 used in the present example embodiment in FIG. 5 are LCD modules including backlight assemblies 110 providing light, and LCD panel assemblies 120 displaying images using the light provided from the backlight assemblies 110. However, the display modules 101 and 102 used in the tiled display apparatus according to the present invention are not limited to LCD modules. Alternatively, plasma display panels (PDPs), organic light emitting diode (OLED) display modules, etc. may be used.

Each backlight assembly 110 may include the lower receiving container 111, the light source 115 and various optical members 117. The tiled display apparatus according to the previous example embodiment in FIG. 2 includes a lamp as light source 115, but the light source 115 according to the present invention is not limited thereto. For example, the backlight assembly 110 may instead include an LED as the light source 115. The LCD panel assembly 120 controls the light transmittance of the light provided from the backlight assembly 110 using liquid crystal, in order to display the image.

Each of the display modules 101 and 102 includes display area A1 and non-display area A2. The image is displayed in the display area A1 and is not displayed in the non-display area A2. The optical plate 205 enlarges the image outputted in the display area A1 by an enlargement rate, and is disposed over each of the display modules 101 and 102 to prevent the boundary of the display modules 101 and 102 from being visible to observers. For example, the optical plate 205 enlarges the image outputted in the display area A1 to cover the non-display area A2. The enlargement rate is adjusted so that edges of neighboring images lie adjacent to each other.

The optical plate 205 includes the base substrate 210, and the Fresnel lens 250 fixed to the base substrate 210.

The image outputted from the display modules 101 and 102 is incident to the base substrate 210. In addition, the base substrate 210 fixes the Fresnel lens 250. For example, the base substrate 210 of the optical plate 205 according to the present example embodiment includes first and second portions 211 and 212, and a connecting portion 215. The first portion 211 has a first thickness T1, the second portion 212 has a second thickness T2 thinner than the first thickness T1, and the connecting portion 215 is disposed between the first and second portions 211 and 215. The connecting portion 215 includes an inclined surface 217 connecting an upper surface of the first portion 211 with an upper surface of the second portion 212. Here, the first portion 211 may have a width corresponding to the non-display area A2. For example, the width of the first portion 211 may be substantially the same as that of the non-display area A2.

The enlargement rate of the image enlarged by the optical plate 205 is dependent on a length of the non-display area A2, a focal distance of the Fresnel lens 250, and a refractivity and a thickness of the various materials included in the optical plate 205.

As the thickness of the optical plate 205 is increased, the enlargement rate of the image outputted from the display modules 101 and 102 is increased. Thus, when the optical plate 205 is insufficiently thick, the image output by the display modules 101 and 102 is not enlarged enough to cover the non-display area A2. Accordingly, the thickness of the base substrate 210 should be thick enough to enlarge the image from the display modules 101 and 102 by the desired enlargement rate. However, in conventional display systems, as the thickness of the optical plate 205 or the thickness of the base substrate is increased, the weight of the optical plate 205, and thus the total weight of the display apparatus is also increased.

Thus, to reduce the weight of the optical plate in the present example embodiment, the thickness T2 of the second portion 212 of the optical plate 205 is thinner than the thickness T1 of the first portion 211 of the optical plate 205. Here, the first portion 211 may have a width corresponding to the non-display area A2. For example, a width of the first portion 211 may be substantially the same as that for the non-display area A2.

In the system of FIG. 5, the image passing through portion A2 of the optical plate 205 is enlarged to a greater degree than that passing through portion A1 of plate 205, so that the optical plate 205 enlarges the image outputted from the display area A1 to cover the non-display area A2. For example, portion A1 of plate 205 may not significantly enlarge the image at all, while portion A2 does.

Accordingly, the first portion 211 of the optical plate 205 corresponding to the non-display area A2 (in this case, the portion of optical plate 205 lying directly over area A2) has a first thickness greater than a predetermined thickness, and the second portion 212 of the optical plate 205 corresponding to the display area A1 (e.g., the portion of optical plate 205 lying directly over area A1) has a second thickness T2 thinner than the first thickness T1 of the first portion 211, so that the weight of the optical plate 205 may be decreased, as compared to a plate that has a uniform first thickness. For example, the first thickness T1 may be between about 8.0 mm and about 10.0 mm, and the second thickness T2 may be between about 1.0 mm and about 2.0 mm. The display area A1 occupies most of the display modules 101 and 102, and thus when the thickness of the second portion 212 corresponding to the display area A1 is deceased, the total weight of the optical plate 205 may be considerably decreased. Accordingly, a weight of the tiled display apparatus may be decreased. In addition, the image is prevented from being excessively enlarged in the display area A1 occupying most of the display modules 101 and 102, and thus the total image is prevented from being distorted.

Referring to FIG. 5, the lower surfaces of the first, second and connecting portions 211, 212 and 215 may be formed substantially coplanar. That is, the lower surface of optical plate 205, or the surface facing display module 101, may be substantially planar. In this case, the connecting portion 215 has an inclined surface 217 connecting the upper surface of the first portion 211 with the upper surface of the second portion 212, due to the difference of the thickness between the first and second portions 211 and 212. However, the inclined surface 217 of the connecting portion 215 may increase a dark portion caused by the non-display area A2.

For example, with reference to FIG. 6, when the Fresnel lens is not disposed on the base substrate 210, a length of the dark portion A3 in which the image is not displayed may be increased by a half of an extended length D/2 due to refraction of light by the inclined surface 217 of the connecting portion 215. The length of the dark portion A3 is increased in both directions with respect to the boundary between the display modules 101 and 102 by the half of the extended length D/2, and thus a total length of the dark portion A3 is increased by the extended length D.

Table 1 shows a relationship between the angle of inclination θ of the inclined surface 217 and the extended length D of the dark portion A3, according to simulation results.

For the results of Table 1, a Fresnel lens was assumed to be absent from the base substrate 210, and the refractive index of the base substrate 210 was assumed to be about 1.49. In addition, a length L1 of the non-display area A2 was assumed to be about 4 mm, the first thickness T1 of the first portion 211 was assumed to be about 8 mm, and the second thickness T2 of the second portion 212 was assumed to be about 2 mm. In such conditions, the extended length D of the dark portion A3 was determined for different values of the inclination angle θ between the inclined surface 217 of the connecting portion 215 and the lower surface of the connecting portion 215.

TABLE 1

| Inclined angle θ [degrees] | Extended length of the dark portion A3 D[mm] |
| --- | --- |
| 10 | 0.5 |
| 20 | 0.9 |
| 30 | 1.5 |
| 40 | 2.1 |
| 50 | 2.8 |
| 60 | 3.6 |
| 70 | 4.8 |
| 80 | 6.4 |

For example, when the inclination angle θ was about 40 degrees, the extended length D of the dark portion A3 was about 2.1 mm. Accordingly, a total length of the dark portion A3 was increased to about 10.1 mm (L1+L1+D=4+4+2.1). However, when the inclination angle was about 20 degrees, the extended length D of the dark portion A3 was about 0.9 mm. Accordingly, the total length of the dark portion A3 was increased to a lesser degree, to a total of about 8.9 mm (L1+L1+D=4+4+0.9).

When the extended length D of the dark portion A3 is longer than about 1 mm, that is, about 25% of the length of the non-display area A2 of about 4 mm, though the image outputted through the Fresnel lens from the display modules 101 and 102 is enlarged, the boundary between the display modules 101 and 102 still becomes visible. Thus, the extended length D of the dark portion A3 is made shorter than about 1 mm.

Thus, referring to Table 1, it is recommended that the inclination angle θ not exceed about 20 degrees. For example, when the base substrate 210 includes the first portion 211 having the first thickness T1, the second portion 212 having the second thickness T2 thinner than the first thickness T1 and the connecting portion 215 disposed between the first and second portions 211 and 212, the inclination angle θ between the inclined surface 217 of the connecting portion 215 and the lower surface of the connecting portion 215 may be more than about 0 degree and equal to or less than about 20 degrees.

The Fresnel lens 250 is a condensing lens, and is different from a convex lens that has a convex central portion. The thickness of the Fresnel lens (i.e., the maximum thickness of each pattern 255) is substantially the same across the lens. The Fresnel patterns 255 of the Fresnel lens 250 protrude toward to the display modules 101 and 102. That is, the upper surface of the Fresnel lens 250 is flat, and the Fresnel lens 250 may have reverse Fresnel patterns that extend downward toward the modules 101, 102. The reverse Fresnel patterns have already been explained with reference to FIGS. 1 and 2, and thus any repetitive explanation will be omitted.

The optical plate 205 may further include the high-refraction layer 260 formed on the upper surface of the Fresnel lens 250, and the anti-reflection layer 270 formed on the high-refraction layer 260. When the anti-reflection layer 270 is formed on the flat upper surface of the Fresnel lens 250 having the reverse Fresnel structure, the anti-reflection layer 270 may be formed to a more uniform thickness. In addition, when the high-refraction layer 260 is disposed between the Fresnel lens 250 and the anti-reflection layer 270, the refractive index of the high-refraction layer 260 is higher than that of the anti-reflection layer 270, so that light incident from outside is more effectively kept from being reflected. The high-refraction layer 260 and the anti-reflection layer 270 are explained in detail with reference to FIG. 2, and thus any repetitive explanation will be omitted.

The optical plate 250 may further include the adhesive layer 280 that is disposed between the Fresnel lens 250 and the base substrate 210, and that fixes the Fresnel lens 250 to the base substrate 210. In addition, the optical plate 205 may further include the spacer 285 maintaining the distance between the Fresnel lens 250 and the adhesive layer 280, so as to prevent the Fresnel patterns 255 of the Fresnel lens 250 from penetrating the adhesive layer 280. The adhesive layer 280 and the spacer 285 (FIG. 4) are explained in detail with reference to FIGS. 2 and 4, and thus any repetitive explanation will be omitted.

These configurations help reduce the weight of the tiled display apparatus. In addition, the image is prevented from being excessively enlarged in the display area A1, and thus the total image may be kept from being distorted.

Figure 7:
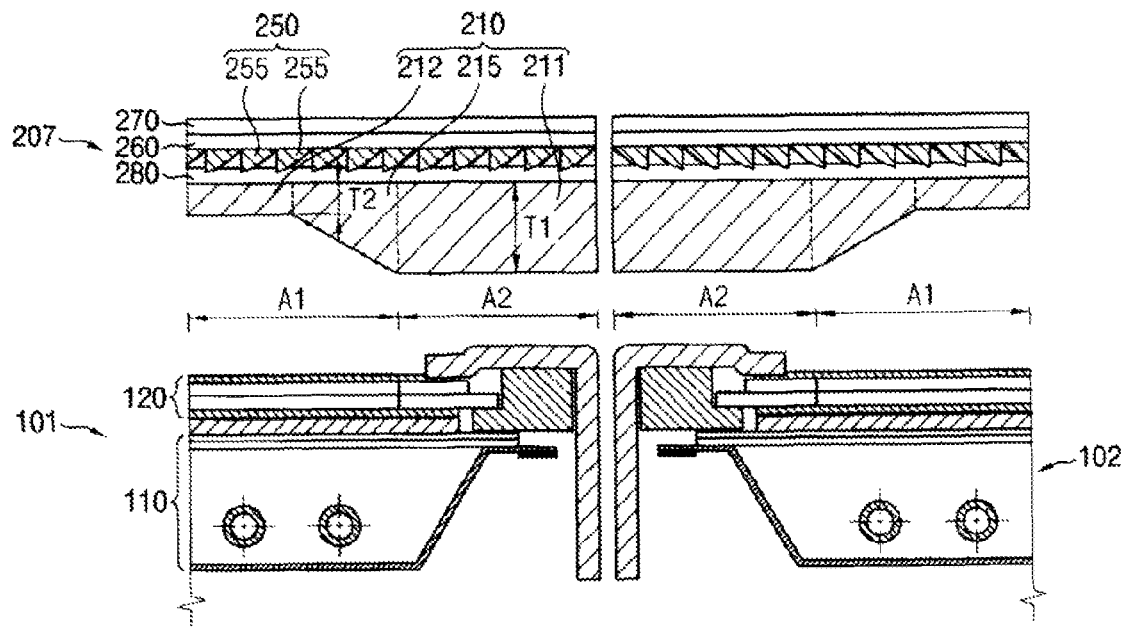
FIG. 7 is a cross-sectional view of a tiled display apparatus according to still another example embodiment of the present invention.

FIG. 7 is a cross-sectional view of a tiled display apparatus according to still another example embodiment of the present invention.

An optical plate 207 of the tiled display apparatus according to the present example embodiment is substantially the same as or similar to the optical plate 205 of FIG. 5, except that it is oriented upside-down. That is, it is the upper surfaces of the first, second and connecting portions 211, 212 and 215 that are substantially coplanar, not the lower surfaces. Thus, the same reference numerals will be used to refer to the same or like parts of the optical plate 205 of the tiled display apparatus in FIG. 5 as those described in the previous embodiment, and any repetitive explanation will be omitted.

Similar to the tiled display apparatus according to the previous example embodiment in FIGS. 1, 2 and 5, the tiled display apparatus according to the present example embodiment includes the display unit 100 having a plurality of display modules 101 and 102, and a plurality of optical plates 207 disposed over the display modules 101 and 102, respectively. As in previous embodiments, this embodiment may include any number and layout of display modules. For example, the tiled display apparatus according to the present example embodiment may include four display modules disposed in a 2×2 matrix shape, nine display modules disposed in a 3×3 matrix shape, or sixteen display modules disposed in a 4×4 matrix shape. The number of the display modules is not limited thereto.

The optical plate 207 enlarges the image outputted from the display area A1 by the enlargement rate, and is disposed over each of the display modules 101 and 102 to prevent the boundary of the display modules 101 and 102 from being seen. For example, the optical plate 207 enlarges the image outputted from the display area A1 to cover the non-display area A2. The enlargement rate is adjusted for the boundaries of each of the enlarged images to be positioned adjacent to each other.

The optical plate 207 includes the base substrate 210, and the Fresnel lens 250 fixed to the base substrate 210. The image outputted from the display modules 101 and 102 is incident onto the base substrate 210. The Fresnel lens 250 has a reverse Fresnel structure, with patterns 255 protruding downward, toward the modules 101, 102. The base substrate 210 of the optical plate 207 according to the present example embodiment includes the first and second portions 211 and 212, and the connecting portion 215. The first portion 211 has the first thickness T1, the second portion 212 has the second thickness T2 thinner than the first thickness T1, and the connecting portion 215 is disposed between the first and second portions 11 and 215.

As the thickness of the optical plate 205 is increased, the enlargement rate of the image outputted from the display modules 101 and 102 is increased. Thus, the thickness of the base substrate 210 should be thick enough to enlarge the image sufficiently to cover the non-display area A2. However, as the thickness of the optical plate 207 or the thickness of the base substrate 210 is increased, the weight of the optical plate 205, and thus the total weight of the display apparatus, is also increased.

To decrease the weight of the optical plate, the second thickness T2 of the second portion 212 of the optical plate 207 is thinner than the first thickness T1 of the first portion 211 of the optical plate 207. As in previous embodiments, the area of portion 211 may be sized and shaped substantially the same as area A2, so that each portion 211 substantially entirely overlaps its corresponding area A2. As mentioned above, the optical plate 205 disposed over each of the display modules 101 and 102 enlarges the image outputted from the display area A1 by the enlargement rate, to prevent the boundary between the display modules 101 and 102 from being visible. In this case, the optical plate 207 enlarges the image outputted from the display area A1 to cover the non-display area A2. However, a significant portion of the optical plate 207 has a second thickness T2 thinner than the first thickness T1, reducing the weight of the optical plate 207.

For example, referring to FIG. 7, the upper surfaces of the first, second and connecting portions are formed to be substantially planar. This is in contrast to the optical plate 205 of FIG. 5, in which the upper surfaces of portions 211 and 212 are disposed at different elevations, rather than being coplanar.

When the upper surface of the base substrate 210 of the optical plate 207 is flat, the Fresnel lens 250 disposed over the base substrate 210 has substantially no inclination. Accordingly, the Fresnel lens 250 of this embodiment can be formed on the upper surface of the base substrate 210 as a relatively simple, flat structure.

The optical plate 207 according to the present example embodiment includes the Fresnel lens 250 that has the Fresnel patterns 255 protruding toward the display modules 101 and 102. The upper surface of the Fresnel lens 250 may be flat, and may have reverse Fresnel patterns facing toward modules 101, 102. The reverse Fresnel patterns are explained in detail with reference to FIGS. 2 and 3, and thus any repetitive explanation will be omitted.

The optical plate 207 may further include the high-refraction layer 260 formed on the Fresnel lens 250, and the anti-reflection layer 270 formed on the high-refraction layer 260. The high-refraction layer 260 and the anti-reflection layer 270 are explained in detail with reference to FIG. 2, and thus any repetitive explanation will be omitted.

The optical plate 207 may further include the adhesive layer 280 that is disposed between the Fresnel lens 250 and the base substrate 210, and that fixes the Fresnel lens 250 to the base substrate 210. In addition, the optical plate 207 may further include the spacer 285 maintaining the distance between the Fresnel lens 250 and the adhesive layer 280 to prevent the Fresnel patterns 255 of the Fresnel lens 250 from pressing into the adhesive layer 280. The adhesive layer 280 and the spacer 285 (FIG. 4) are explained in detail with reference to FIGS. 2 and 4, and thus any repetitive explanation will be omitted.

Accordingly, when the optical plate 207 according to the present example embodiment is used in the tiled display apparatus, the weight of the tiled display apparatus may be decreased while still maintaining a relatively simple, non-inclined structure for the Fresnel lens 250.

While the present invention has been particularly shown and described with reference to example embodiments thereof, it will be understood by those of ordinary skill in the art that various changes in form and details may be made therein without departing from the spirit and scope of the present invention as defined by the following claims.

What is claimed is:

1. An optical plate comprising:
   a base substrate into which an image is to be directed;
   a Fresnel lens affixed to an upper surface of the base substrate, the Fresnel lens having a plurality of Fresnel patterns extending toward the base substrate; and
   an anti-reflection layer formed on an upper surface of the Fresnel lens and configured to reduce a reflection of ambient light;
   wherein the optical plate is configured to include:
      a peripheral portion having a first thickness as measured from a lower surface of the base substrate to an upper surface of the anti-reflection layer, the lower surface of the base substrate being opposite to the upper surface of the base substrate;
      a central portion surrounded by the peripheral portion and having a second thickness as measured from the lower surface of the base substrate to the upper surface of the anti-reflection layer, the second thickness being thinner than the first thickness; and
      a connecting portion disposed between the peripheral portion and the central portions; and
   wherein the lower surface of the base substrate is substantially flat in the peripheral portion and the central portion.

2. The optical plate of claim 1, wherein lower surfaces of the peripheral portion, the central portions and the connecting portion are substantially coplanar, and the connecting portion has a generally inclined surface connecting an upper surface of the peripheral portion with an upper surface of the central portion.

3. The optical plate of claim 1, wherein lower surfaces of the peripheral portion, the central portions and the connecting portion are substantially coplanar, and the connecting portion has a generally inclined surface connecting an upper surface of the peripheral portion with an upper surface of the central portion, and an inclination angle of the inclined surface with respect to the upper surface of the central portion is more than about 0 degrees and not more than about 20 degrees.

4. The optical plate of claim 3, further comprising a high-refraction layer disposed between the Fresnel lens and the anti-reflection layer, the high-refraction layer having a refractive index higher than that of the anti-reflection layer.

* * * * *